3,016,378
AMINO-SUBSTITUTED PURINE DERIVATIVES
Josef Roch, Biberach (Riss), Germany, assignor to Dr. Karl Thomae G.m.b.H., Biberach (Riss), Germany, a corporation of Germany
No Drawing. Filed July 1, 1959, Ser. No. 824,172
9 Claims. (Cl. 260—247.5)

This invention relates to amino-substituted purine derivatives and more particularly to compounds having the tautomeric structural formulas

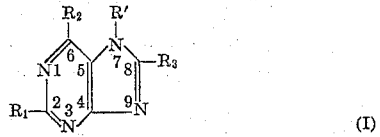

and

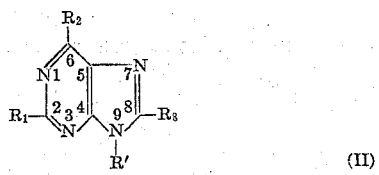

wherein:

R' is hydrogen, an alkyl or substituted alkyl radical, an aralkyl or substituted aralkyl radical, or an aryl or substituted aryl radical,
one of substituents $R_1$, $R_2$ and $R_3$ is a nitrogen atom which is a member of a heterocyclic ring comprising a 4-, 5- or 6-membered methylene chain which may be substituted by lower alkyl, lower alkoxy or halogene and which may be interrupted by a further heteroatom, such as nitrogen or oxygen,
one other of substituents $R_1$, $R_2$ and $R_3$ is a substituted amino radical, a hydrazino or substituted hydrazino radical, a guanido or substituted guanido radical, or a nitrogen atom which is a member of a heterocyclic ring comprising a 4-, 5- or 6-membered methylene chain which may be substituted by lower alkyl, lower alkoxy or halogene and which may be interrupted by a further heteroatom, such as nitrogen or oxygen,
the third of substituents $R_1$, $R_2$ and $R_3$ is hydrogen, halogen, a hydroxyl or substituted hydroxyl radical, a mercapto or substituted mercapto radical, an amino or substituted amino radical, a hydrazino or substituted hydrazino radical, a guanido or substituted guanido radical, or a nitrogen atom which is a member of a heterocyclic ring comprising a 4-, 5- or 6-membered methylene chain which may be substituted by lower alkyl, lower alkoxy or halogene and which may be interrupted by a further heteroatom, such as nitrogen or oxygen, and
$R_3$ in addition may be an alkyl or substituted alkyl radical, an aralkyl or substituted aralkyl radical, or an aryl or substituted aryl radical, and their non-toxic, water-soluble acid addition salts, such as their hydrochlorides.

The amino-substituted purine derivatives according to the present invention may readily be prepared by a process which, in principle, comprises reacting a halogenated purine having the tautomeric structural formulas

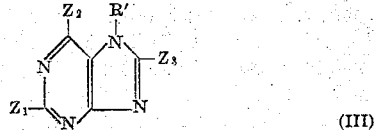

or

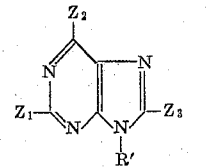

wherein:
R' has the meanings previously defined in connection with Formulas I and II,
one of substituents $Z_1$, $Z_2$ and $Z_3$ is a halogen atom,
one other of substituents $Z_1$, $Z_2$ and $Z_3$ is a substituted amino radical, a hydrazino or substituted hydrazino radical, a guanido or substituted guanido radical, a halogen atom, or a nitrogen atom which is a member of a heterocyclic ring comprising a 4-, 5- or 6-membered methylene chain which may be substituted by lower alkyl, lower alkoxy or halogene and which may be interrupted by a further heteroatom, such as nitrogen or oxygen, and
the third of substituents $Z_1$, $Z_2$ and $Z_3$ is hydrogen, a halogen atom, a hydroxyl or substituted hydroxyl radical, a mercapto or substituted mercapto radical, an amino or substituted amino radical, a hydrazino or substituted hydrazino radical, or a nitrogen atom which is a member of a heterocyclic ring comprising a 4-, 5- or 6-membered methylene chain which may be substituted by lower alkyl, lower alkoxy or halogene and which may be interrupted by a further heteroatom, such as nitrogen or oxygen, and $R_3$ in addition may be an alkyl or substituted alkyl radical, an aralkyl or substituted aralkyl radical, or an aryl or substituted aryl radical with a compound of the formula $$H-R \qquad (V)$$

wherein R is a nitrogen atom which is a member of a heterocyclic ring comprising a 4-, 5- or 6-membered methylene chain which may be substituted by lower alkyl, lower alkoxy or halogene and which may be interrupted by a further heteroatom, such as nitrogen or oxygen, in the presence of a hydrogen halide-neutralizing compound at a temperature between −20 and +250° C.

In those instances where the halogenated purine used as the starting material, i.e. a compound of the formulas III or IV above, also has as a substituent at least one nitrogen atom which is a member of a heterocyclic ring comprising a 4-, 5- or 6-membered methylene chain which may be substituted by lower alkyl, lower alkoxy or halogene and which may be interrupted by a further heteroatom, such as nitrogen or oxygen, R in Compound V may also be a substituted amino radical, a hydrazino or substituted hydrazino radical, or a guanido or substituted guanido radical. In those instances where the halogenated purine reaction component contains as one substituent a nitrogen atom which is a member of a heterocyclic ring comprising a 4-, 5- or 6-membered methylene chain which may be substituted by lower alkyl, lower alkoxy or halogene and which may be interrupted by a further hetero atom, such as nitrogen or oxygen, and as another substituent a substituted amino radical the substituent of which in turn includes a nitrogen atom which is a member of a heterocyclic ring comprising a methylene chain which may be substituted by lower alkyl, lower alkoxy or halogene and which may be interrupted by a further heteroatom, such as oxygen or nitrogen, radical R in Compound V may also be a substituted hydroxyl or substituted mercapto radical.

Thus, one or more of the halogen atoms of the halogenated purine are exchanged for the heterocyclic radical R, accompanied by the formation of a hydrogen halide which is tied up by the hydrogen halide-neutralizing compound present in the reaction mixture.

Typical examples of halogenated purines of the Formulas III and IV which may be used as starting materials in the preparation of the purine derivatives according to the present invention are the following:

2,6,8-trichloro-purine, 2,6-dichloro-7-methyl-purine, 2,6,8-tribromo-7-methyl-purine, 2-chloro-6,8-diiodo-7-methyl-purine, 2,6,8-trichloro-9-phenyl-purine, 2,6-dichloro-8-hydroxy-9-phenyl-purine, 2-chloro-6,8-dipiperidyl-7-methyl-purine, 2,6-dichloro-8-anilino-7-methyl-purine and 2-chloro-6-hydrazino-8-morpholyl-7-methyl-purine.

Illustrative examples of suitable compounds of the Formula V which may be used in the preparation of the purine derivatives according to the present invention are the following: Alcohols, phenols, primary and secondary amines, heterocyclic amines such as morpholine, piperidine, pyrrolidine or piperazine, which may be substituted with lower alkyl, lower alkoxy or halogene, guanidines, hydrazines, dialkylaminoalkylamines, amino alcohols, mercaptans, thiocarboxylic acids and thiophenols.

As previously indicated, it is advantageous to perform the reaction between the halogenated purine III or IV and the Compound V in the presence of an acid-binding agent, and specifically in the presence of a compound capable of tying up or neutralizing the hydrogen halide formed by the reaction. Typical examples of suitable such acid-binding agents are alkali metal hydroxides, alkali metal carbonates, alkali metal alcoholates and tertiary amines. If the reaction component of the formula H—R (V) is itself capable of acting as an acid-binding agent, it may be provided in excess over the amount stochiometrically required to bring about the desired substitution of the halogen atom or atoms in the halogenated purine reactant. Under such conditions the excess then functions as the necessary acid-binding component of the reaction mixture.

The reaction between the halogenated purine and the Compound V may be carried out in the presence of solvents or diluents, preferably inert. However, the presence of such diluents or solvents is not essential to the reaction. Examples of suitable inert solvents are acetone, dioxan, benzene, dimethyl-formamide and the like.

The optimum reaction temperature within the range of $-20$ and $+250°$ C. varies with the reaction components but can readily be determined by a simple preliminary test run. In those instances where the reaction mixture includes a diluent or solvent and the boiling point of the mixture is not high enough to reach the previously determined optimum reaction temperature at atmospheric pressure, the reaction may be carried out at super atmospheric pressure sufficiently elevated to raise the boiling point of the reaction mixture to the optimum reaction temperature.

If the reaction mixture does not contain alkalies and the optimum reaction temperature is sufficiently low, water and alcohols may be employed at the diluent or solvent medium because, for all practical purposes, they do not react with the halogenated purines under such mild conditions.

Finally, if the reactant H—R (V) is a liquid under the optimum reaction conditions it may itself serve as the diluent or solvent medium, in which case it is provided in the reaction mixture in sufficient excess over the amount stochiometrically required to bring about the displacement of the desired number of halogens in the halogenated purine (III or IV) by the radical R.

If the halogenated purine starting material is one wherein two or all three of substituents $Z_1$, $Z_2$ and $Z_3$ are halogen atoms, the exchange of one, two or all three halogens for the radical R of Compound V may be accomplished stepwise. More particularly, we have found that at low or moderately elevated temperatures only one or two of the halogen atoms in the purine starting material are replaced by radical R, whereas considerably higher temperatures within the above-indicated operative range are required to replace all three of the halogen atoms if the purine starting material is a tri-halo-substituted purine. For example, by reacting 2,6,8-trichloro-7-methyl-purine with morpholine in the presence of dioxan or dimethylformamide as a solvent medium while cooling the reaction mixture so that the temperature does not rise above 5° C. only one chlorine atom, most probably that in the 8-position, is replaced by a morpholyl radical. On the other hand, if the same reactants are heated slightly in the presence of dioxan as a solvent two chlorine atoms, probably those in the 6- and 8-positions, are replaced by morpholyl radicals. Finally, if 2,6,8-trichloro-7-methyl-purine is refluxed for one half hour with an excess of morpholine at the boiling point of the mixture, the excess of morpholine serving as the solvent medium in this case, all three of the chlorine atoms in the trichloro-substituted purine are replaced by morpholyl radicals and the reaction product is 2,6,8-trimorpholyl-7-methyl-purine.

We have further found that the halogen atoms in the halo-substituted purine starting materials can be surprisingly easily replaced by heterocyclic amino radicals, such as morpholyl, piperidyl, piperazino or pyrrolidyl radicals, which may be substituted by lower alkyl, lower alkoxy or halogene, with the aid of the method described herein. To illustrate, the preparation of 2-(γ-diethylamino-propylamino)-6-diethylamino-7-methyl-purine requires very vigorous reaction conditions; a mixture of 2-chloro-6-diethylamino-7-methyl-purine and γ-diethylamino-propylamine must be heated for 17 hours at 195° C. under pressure (see J.A.C.S., vol. 67 (1945), page 1271). In contrast thereto, the preparation of 2,6,8-tripiperidyl-7-methyl-purine from 2,6,8-trichloro-7-methyl-purine and piperidine according to the present invention merely requires refluxing the reaction mixture for two hours at its boiling point (about 106° C.).

The reaction for the preparation of the amino-substituted purine derivatives according to the present invention may also be performed in the presence of reaction accelerators, among which copper, copper salts and potassium iodide have been found to be particularly suitable.

The following examples will further illustrate the present invention and enable others to understand it more completely. It will be understood, however, that the invention is not limited to the particular examples given below.

EXAMPLE 1

*Preparation of various 2-chloro-6,8-diamino-7-methyl purine derivatives from 2,6,8-trichloro-7-methyl purine and the corresponding amino compounds*

(a) 2-CHLORO-6,8-DIPIPERIDYL-7-METHYL PURINE 20 cc. piperidine were added to a solution of 9.5 gm. (0.04 mol) 2,6,8-trichloro-7-methyl purine in 100 cc. dioxan, accompanied by stirring. Piperidine hydrochloride precipitated out, and the solution was heated to the boiling point. After cooling, the mixture thus obtained was poured into about 350 cc. water, whereby the purine hydrochloride redissolved and an initially greasy precipitate formed which, however, soon solidified. The precipitate was filtered off on a vacuum filter, the filter cake was washed and then dried at room temperature. 10.2 gm., that is 76% of theory, of a compound having the structural formula

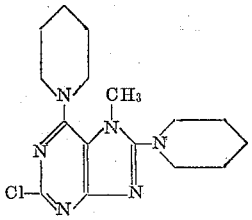

were obtained. For purposes of purification, the raw compound was recrystallized once from methanol, whereupon it was obtained in the form of colorless, brilliant, elongated leaflets having a melting point of 140 to 142° C.

(b) 2-CHLORO-6,8-DIMORPHOLYL-7-METHYL PURINE

By following a procedure analogous to that described under (a) above, but using instead of piperidine an equivalent amount of morproline, a compound having the structural formula

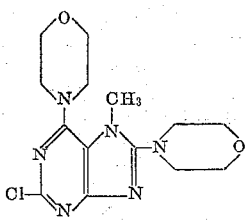

was obtained with a yield of 75% of theory. Upon reprecipitation of the raw product from hot 0.5 N hydrochloric acid, the purified product was obtained in the form of an ivory micro-crystalline powder having a melting point of 284 to 286° C.

EXAMPLE 2

*Preparation of various 2-chloro-6,8-diamino-7-methyl purine derivatives from 2,6-dichloro-8-amino-7-methyl purines and the corresponding amines*

(a) 2-CHLORO-6-MORPHOLYL-8-BENZYLAMINO-7-METHYL PURINE

A mixture of 3.1 gm. (0.01 mol) 2,6-dichloro-8-benzyl-amino-7-methyl purine, having a melting point of 226 to 228° C. and 5 cc. morpholine, dissolved in 30 cc. dimethyl formamide, was heated for 1 hour at about 125° C. The reaction solution thus obtained was then poured into 150 cc. water, whereby an initially greasy precipitate formed which solidified after being allowed to stand for a short period of time. The precipitate was separated by vacuum filtration, washed and dried. 3.1 gm., that is 86% of theory, of a compound having the structural formula

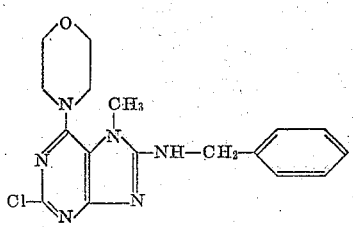

were obtained. Upon recrystallization of the raw product from methanol, the purified product was obtained in the form of virtually colorless, brilliant needles having a melt-pint of 211 to 213° C.

(b) 2-CHLORO-6-HYDRAZINO-8-MORPHOLYL-7-METHYL PURINE

By following a procedure analogous to that described under (a) above, but using instead of morpholine and 2,6-dichloro-8-benzylamino-7-methyl purine an equivalent amount of hydrazine and 2,6-dichloro-8-morpholyl-7-methyl purine, a compound having the structural formula

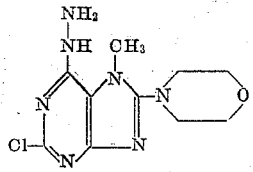

was obtained with a yield of 95% of theory. Reprecipitated from cold, approximately 0.4 N hydrochloric acid, the purified product was obtained in the form of virtually colorless, microcrystalline needles which had no melting point, but decomposed at above 250° C.

(c) 2-CHLORO-6-HYDRAZINO-8-PIPERIDYL-7-METHYL PURINE

By following a procedure analogous to that described under (b) above, but using instead of 2,6-dichloro-8-morpholyl-7-methyl purine, an equivalent amount of 2,6-dichloro-8-piperidyl-7-methyl-purine, a compound having the structural formula

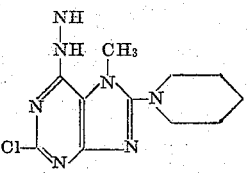

was obtained with a yield of 57% of theory. Upon reprecipitation from cold, approximately 0.4 N hydrochloric acid, the product was obtained in the form of a light gray, microcrystalline powder which decomposed around 250° C.

(d) 2-CHLORO-6-(γ-METHOXY-PROPYLAMINO)-8-PIPERIDYL-7-METHYL PURINE

By following a procedure analogous to that described under (c) above, but using instead of hydrazine, an equivalent amount of γ-hydroxy-propylamine, a compound having the structural formula

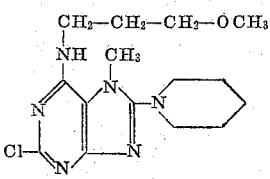

was obtained with a yield of 81% of theory. Upon reprecipitation from cold, 0.1 N hydrochloric acid, the purified product was obtained in the form of virtually colorless, microcrystalline needles having a melting point of 114 to 116° C.

(e) 2-CHLORO-6-GUANIDO-8-PIPERIDYL-7-METHYL PURINE

By following a procedure analogous to that described under (c) above, but using instead of hydrazine, an equivalent amount of guanidine, a compound having the structural formula

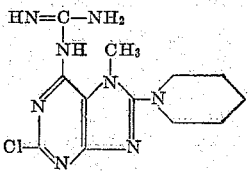

was obtained with a yield of 89% of theory. Recrystallized from methanol, the purified product was obtained in the form of colorless, microcrystalline needles having a melting point of 130 to 132° C.

(f) 2-CHLORO-6-DIETHYLAMINO-8-PIPERIDYL-7-METHYL PURINE

By following a procedure analogous to that described under (c) above, but using instead of hydrazine, an equivalent amount of diethylamine, a compound having the structural formula was obtained with a yield of 98% of theory. Recrystallized from methanol, the purified product was obtained in the form of virtually colorless, flat prisms having a melting point of 108 to 110° C.

(g) 2-CHLORO-6-(γ-DIMETHYLAMINO-PROPYLAMINO)-8-PIPERIDYL-7-METHYL PURINE

By following a procedure analogous to that described under (c) above, but using instead of hydrazine an equivalent amount of γ-dimethylamino-propylamine, a compound having the structural formula was obtained with a yield of 81% of theory. Reprecipitated from cold, about 0.05 N hydrochloric acid, the purified product was obtained in the form of colorless, microcrystalline, elongated, rectangular leaflets having a melting point of 91 to 93° C.

EXAMPLE 3

*2,6,8-trimorpholyl purine from 2,6,8-trichloropurine and morpholine*

A mixture of 1.5 gm. (about 0.005 mol) 2,6,8-trichloropurine, 20 cc. morpholine and 0.1 gm. copper sulfate was heated for two hours at 200 to 210° C. in a closed tube. The reaction mixture was then taken up in about 100 cc. water. The undissolved portion was separated by vacuum filtration, yielding 0.9 gm., that is 48% of theory, of a compound having the structural formula For purposes of analysis, the raw product was recrystallized three times from methanol and then dried at 60° C. and a pressure of 0.1 kg./cm.$^2$. The purified product was obtained in the form of colorless needles having a melting point of 247 to 248° C.

*Analysis.*—$C_{17}H_{25}O_3N_7$—molecular weight: 375.4. Calculated: C, 54.41%; H, 6.71%; N, 26.11%. Found: C, 55.17%; H, 6.78%; N, 25.83%.

EXAMPLE 4

*Preparation of various 2,6,8-triamino-7-methyl purine derivatives from 2-chloro-6,8-diamino purines and the the corresponding amines*

(a) 2-MORPHOLYL-6,8-DI-METHYLAMINO-7-METHYL PURINE

A mixture of 3.4 gm. (0.015 mol) 2-chloro-6,8-dimethylamino-7-methyl purine, having a melting point of 247 to 249° C. and obtained from 2,6,8-trichloro-7-methyl purine and an absolute alcohol solution of methylamine at 100° C. under pressure, and 10 cc. morpholine was heated for two hours in a closed tube at 200° C. The clear, weakly yellow reaction solution thus obtained was admixed with about 100 cc. water, whereby a colorless crystalline precipitate formed. The precipitate was separated by vacuum filtration washed and dried at 110° C. 3.5 gm., that is 84% of theory, of a compound having the structural formula were obtained. For purification, the raw product was reprecipitated once from cold 0.1 N hydrochloric acid. The purified product was obtained in the form of microcrystalline colorless powder, primarily composed of flat prisms having a melting point of 307 to 309° C. (decomposition and brown discoloration).

*Analysis.*—$C_{12}H_{19}ON_7$—molecular weight: 277.3. Calculated: C, 51.97%; H, 6.91%; N, 35.36%. Found: C, 51.90%; H, 6.96%; N, 35.30%.

(b) 2-MORPHOLYL-6,8-BIS-(DIMETHYLAMINO)-7-METHYL PURINE

By following a procedure analogous to that described under (a) above, but using instead of 2-chloro-6,8-dimethylamino-7-methyl purine an equivalent amount of 2-chloro-6,8-bis-(di-methylamino) - 7 - methyl purine, a compound having the structural formula was obtained with a yield of 84% of theory. Recrystallized from water, the purified product was obtained in the form of a colorless microcrystalline powder (rombohedrons) having a melting point of 195 to 197° C.

(c) 2,6,8-TRIMORPHOLYL-7-METHYL PURINE

By following a procedure analogous to that described under (a) above, but using instead of 2-chloro-6,8-dimethylamino-7-methyl purine an equivalent amount of 2-chloro-6,8-di-morpholyl-7-methyl purine, a compound having the structural formula was obtained with a yield of 81% of theory. Recrystallized from water, the purified product was obtained in the form of colorless needles having a melting point of 238.5 to 239.5° C.

(d) 2-MORPHOLYL-6,8-DIPIPERIDYL-7-METHYL PURINE

By following a procedure analogous to that described under (a) above, but using instead of 2-chloro-6,8-dimethylamino-7-methyl purine an equivalent amount of 2-chloro-6,8-dipiperidyl-7-methyl purine, a compound having the structural formula was obtained with a yield of 95% of theory. After reprecipitation from a mixture of 0.5 N hydrochloric acid and alcohol (2:1) with ammonia, the purified product was obtained in the form of a colorless, microcrystalline powder having a melting point of 189 to 190° C.

(e) 2-PYRROLIDYL-6,8-DIMORPHOLYL-7-METHYL PURINE

By following a procedure analogous to that described under (a) above, but using instead of 2-chloro-6,8-dimethylamino-7-methyl purine and morpholine an equivalent amount of 2-chloro-6,8-dimorpholyl - 7 - methyl purine and pyrrolidine, a compound having the structural formula

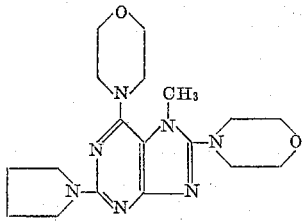

was obtained with a yield of 89% of theory. Upon reprecipitation from 0.1 N hydrochloric acid and drying at 110° C., the purified product was obtained in the form of small, colorless needles having a melting point of 197 to 199° C.

(f) 2-METHYL-ETHANOLAMINO-6,8-DIMORPHOLYL-7-METHYL PURINE

By following a procedure analogous to that described under (e) above, but using instead of pyrrolidine an equivalent amount of methyl-ethanolamine, a compound having the structural formula

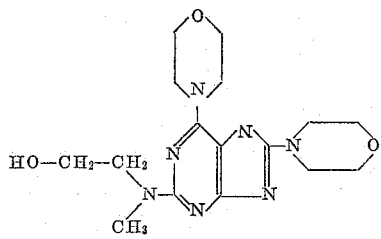

was obtained with a yield of 64% of theory. Recrystallized from water, the purified product was obtained in the form of a colorless, microcrystalline powder (prisms) having a melting point of 148–150° C.

(g) 2-MORPHOLYL-6-HYDRAZINO-8-MORPHOLYL-7-METHYL PURINE

By following a procedure analogous to that described under (a) above, but using instead of 2-chloro-6,8-dimethylamino-7-methyl purine an equivalent amount of 2-chloro-6-hydrazino-8-morpholyl-7-methyl purine, a compound having the structural formula

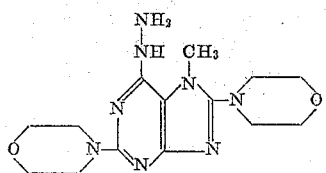

was obtained with a yield of 42% of theory. Recrystallized from methanol, the purified product was obtained in the form of a virtually colorless, microcrystalline powder (short prisms) having a melting point of 221 to 223° C.

(h) 2-(β-HYDROXYETHYLAMINO)-6,8-DIPIPERIDYL-7-METHYL PURINE

By following a procedure analogous to that described under (d) above, but using instead of morpholine an equivalent amount of β-hydroxy-ethylamine, a compound having the structural formula

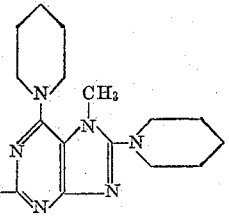

was obtained with a yield of 80% of theory. Reprecipitated from about 0.02 N hydrochloric acid, the purified product was obtained in the form of a colorless, microcrystalline powder having a melting point of 220–222° C.

(i) 2-MORPHOLYL-6-DIETHYLAMINO-8-PIPERIDYL-7-METHYL PURINE

By following a procedure analogous to that described under (a) above, but using instead of 2-chloro-6,8-dimethylamino-7-methyl purine an equivalent amount of 2-chloro-6-diethylamino-8-piperidyl - 7 - methyl purine, a compound having the structural formula

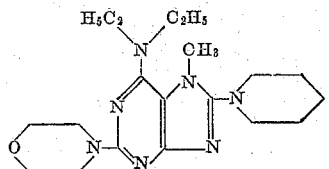

was obtained with a yield of 78% of theory. Recrystallized from methanol, the purified product was obtained in the form of very small, colorless prisms having a melting point of 191 to 193° C.

EXAMPLE 5

Preparation of various 2,6,8-triamino-7-methyl purine derivatives from 2,6-dichloro-8-amino-7-methyl purines and the corresponding amines (a) 2,6-DIMORPHOLYL-8-PIPERIDYL-7-METHYL PURINE A mixture of 2.9 gm. (0.01 mol) 2,6-dichloro-8-piperidyl-7-methyl purine, having a melting point of 143 to 145° C. and obtained from 2,6,8-trichloro-7-methyl purine and piperidine in the presence of dimethylformamide under cooling and 10 cc. (0.1 mol) morpholine was heated for about two hours at 200° C. in a closed tube. The raw reaction product was immediately reprecipitated from about 1 N hydrochloric acid, separated by vacuum filtration, washed with water, and dried at 110° C. 3.6 gm., that is 93% of theory, of a compound having the structural formula

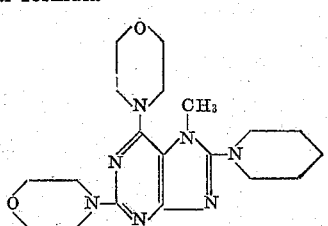

were obtained in the form of a virtually colorless microcrystalline powder having a melting point of 206 to 208° C. The product thus obtained was practically pure, but for analysis it was once again reprecipitated from very dilute sulfuric acid and recrystallized once from a mixture of ethanol and water (1:2). The purified product was thereby obtained in the form of colorless microcrystalline prisms having a melting point of 209 to 211° C.

Analysis.—$C_{19}H_{29}O_2N_7$—molecular weight: 387.5. Calculated: C, 58.89%; H, 7.54%. Found: C, 59.05%; H, 7.62%.

(b) 2,6-DIMORPHOLYL-8-ANILINO-7-METHYL PURINE

By following a procedure analogous to that described under (a) above, but using instead of 2,6-dichloro-piperidyl-7-methyl purine an equivalent amount of 2,6-dichloro-8-anilino-7-methyl purine, a compound having the structural formula

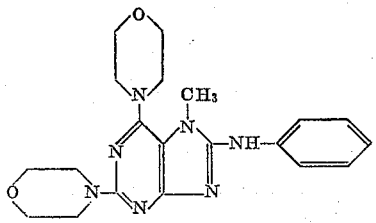

was obtained with a yield of 81% of theory. Recrystallized from a mixture of dimethylformamide and water (1:2), the purified product was obtained in the form of small, colorless, brilliant leaflets having a melting point of 240 to 242° C.

(c) 2,6-DIMORPHOLYL-8-BENZYLAMINO-7-METHYL PURINE

By following a procedure analogous to that described under (a) above, but using instead of 2,6-dichloro-8-piperidyl-7-methyl purine an equivalent amount of 2,6-dichloro-8-benzylamino-7-methyl purine, a compound having the structural formula

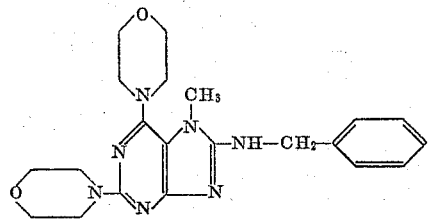

was obtained with a yield of 84% of theory. Reprecipitated from very dilute hydrochloric acid, the purified product was obtained in the form of a colorless microcrystalline powder having a melting point of 197 to 199° C.

EXAMPLE 6

Preparation of various 2,6-diamino-7-methyl purine derivatives from 2,6-dichloro-7-methyl purine and the corresponding amines (a) 2,6-DIMORPHOLYL-7-METHYL PURINE A mixture of 3.8 gms. (about 0.02 mol) 2,6-dichloro-7-methyl purine and 15 cc. morpholine was heated in a closed tube for two hours at 200° C. After cooling, the reaction product, a colorless precipitate was rinsed out of the tube with 120 cc. water, filtered on a vacuum filter, the filter cake was washed with water and dried at 110° C. 4.8 gms., that is 84% of theory, of a compound having the structural formula

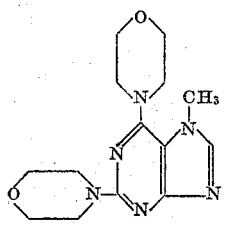

were obtained. For analysis, the raw product was reprecipitated once from 0.1 N hydrochloric acid, yielding microcrystalline, colorless short prisms having a melting point of 215 to 217° C.

Analysis. — $C_{14}H_{20}O_2N_6$ — molecular weight: 304.4. Calculated: C, 55.25%; H, 6.62%. Found: C, 55.25%; H, 6.60%.

(b) 2,6-DIPIPERIDYL-7-METHYL PURINE

By following a procedure analogous to that described under (a) above, but using instead of morpholine an equivalent amount of piperidine, a compound having the structural formula

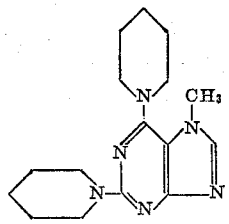

was obtained with a yield of 82% of theory. Upon recrystallization from a mixture of gasoline and benzene (3:1), a virtually colorless, microcrystalline powder (needles) having a melting point of 176 to 178° C. was obtained.

EXAMPLE 7

2,6-dimorpholyl-8-hydroxy purine

A mixture of 3.1 gms. (0.015 mol) 2,6-dichloro-8-hydroxy purine, 10 cc. morpholine and the tip of a spatula full of copper sulfate was heated in a closed tube for two hours at 200° C. Thereafter, the reaction mixture was rinsed out of the tube with about 150 cc. water and the aqueous solution was neutralized with dilute hydrochloric acid. The precipitate formed thereby was separated by vacuum filtration, washed with water and dried at 110° C. 3.5 gms., that is 76% of theory, of a compound having the structural formula

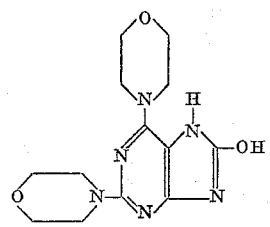

were obtained. For purification, the raw product was reprecipitated once from dilute sodium hydroxide with hydrochloric acid and once from hot dilute hydrochloric acid with ammonia. The colorless powder thus obtained did not exhibit any melting point up to 300° C.

Analysis. — $C_{13}H_{18}O_3N_6$ — molecular weight: 306.3. Calculated: C, 50.97%; H, 5.92%. Found: C, 50.37%; H, 5.98%.

EXAMPLE 8

2-ethylmercapto-6,8-dimorpholyl-7-methyl-purine

A mixture consisting of a solution of 6.8 gm. (0.02 mol) 2-chloro-6,8-dimorpholyl-7-methyl-purine in 33 cc. dioxan and a suspension of sodium ethylmercaptide in dioxan was heated in a closed tube for 45 minutes at 200° C. The sodium ethylmercaptide suspension was prepared from 15 cc. ethylmercaptan and 0.6 gm. sodium in 15 cc. dioxan. After cooling, the reaction mixture was rinsed out of the tube with about 100 cc. ethanol and the insoluble portion was separated by vacuum filtration. The filtrate was then evaporated to dryness. The evaporation residue was combined with the filter cake. 6.8 gm., that is 93% of theory, of a compound having the structural formula

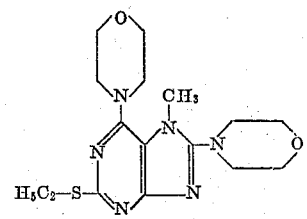

were thus obtained. For purification, the raw reaction product was reprecipitated twice from 1.5 to 2 liters of very dilute hydrochloric acid. The purified product was obtained in the form of colorless microcrystalline prisms having a melting point of 188 to 190° C.

*Analysis.*—$C_{16}H_{24}O_2N_6S$—molecular weight: 364.5. Calculated: C, 52.72%; H, 6.64%. Found: C, 52.70%; H, 6.64%.

EXAMPLE 9

*2-(β-ethoxy-ethoxy)-6,8-dimorpholyl-7-methyl-purine*

A mixture consisting of 6.8 gm. (0.02 mol) 2-chloro-6,8-dimorpholyl-7-methyl-purine and a solution of 0.5 gm. (0.022 mol) sodium. 75 cc. ethylglycol was refluxed for 1½ hours at the boiling point. Thereafter, a substantial portion of the alcohol in the mixture was distilled off and the residue was poured into 250 cc. water, whereby a virtually colorless precipitate formed. The precipitate was separated by vacuum filtration, washed, and dried. 4.8 gm., that is 61% of theory of a compound having the structural formula

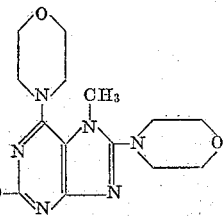

were obtained. For purification, the raw product was recrystallized twice from a mixture of petroleum ether and benzene (3:1). The purified product was obtained in the form of virtually colorless microcrystalline prisms having a melting point of 134 to 136° C.

EXAMPLE 10

*2,6,8-trimorpholyl-7-methyl-purine*

(a) A mixture of 4.2 gm. (0.01 mol) 2-chloro-6,8-diiodo-7-methyl-purine and 20 cc. morpholine was heated for one hour at 200° C. in a closed tube. The reaction mixture was then rinsed out of the tube with about 100 cc. water and the aqueous solution was allowed to stand for some time. A crystalline precipitate separated out which was filtered off on a vacuum filter, washed with water and dried at 110° C. 3.1 gm., that is 79% of theory, of a compound having the structural formula

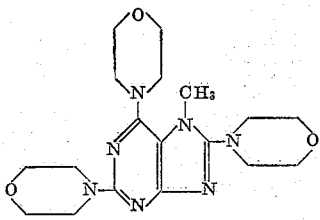

were obtained. Upon reprecipitation from 0.1 N hydrochloric acid and recrystallization from water, the purified product was obtained in the form of colorless needles having a melting point of 238 to 240° C.

(b) By repeating the procedure described under (a) above, but using 2,6,8-tribromo-7-methyl-purine instead of 2-chloro-6,8-diiodo-7-methyl-purine, the same reaction product was obtained.

EXAMPLE 11

*2,6,8-trimorpholyl-9-phenyl-purine*

A mixture of 2.7 gm. (0.009 mol) 2,6,8-trichloro-9-phenyl-purine and 27 cc. morpholine was heated for 1½ hours at 160° C. in a closed tube. Thereafter, the reaction mixture was rinsed out of the tube with water, whereby a colorless, amorphous precipitate formed, while the initially precipitated morpholine hydrochloride dissolved. 2.5 gm., that is 65% of theory of a compound having the structural formula

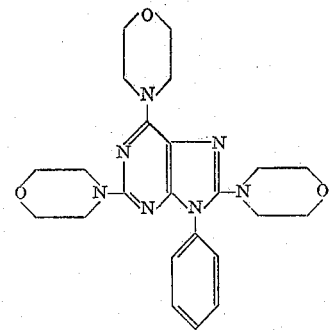

were obtained by separating the precipitate, washing and drying it. For analysis, the raw product was reprecipitated twice from warm 1 N hydrochloric acid and recrystallized once from methanol. The purified product was a virtually colorless, microcrystalline powder having a melting point of 223 to 224° C.

*Analysis.*—$C_{23}H_{29}O_3N_7$—molecular weight: 451.5. Calculated: C, 61.18%; H, 6.47%. Found: C, 61.05%; H, 6.29%.

EXAMPLE 12

*2,6-dipiperidyl-8-hydroxy-9-phenyl-purine*

A mixture of 2.8 gm. (0.01 mol) 2,6-dichloro-8-hydroxy-9-phenyl-purine and 28 cc. piperidine was heated for two hours at 160° C. in a closed tube. The reaction mixture was then taken up in water, whereby the reaction product precipitated as a colorless flocculent precipitate, while the initially precipitated piperidine hydrochloride dissolved. The precipitate was separated by vacuum filtration, washed and dried. 2.6 gm., that is 96% of theory, of a compound having the structural formula

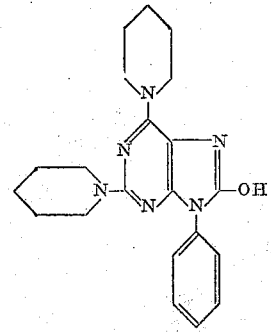

were obtained. For analysis, the raw reaction product was recrystallized once from a mixture of ethanol and dioxan (1:1). The purified reaction product was a colorless, microcrystalline powder (short prisms) having a melting point of 306° C. At 300° C. it began to turn brown and sintered.

*Analysis.*—$C_{21}H_{26}ON_6$—molecular weight: 378.5. Calculated: C, 66.64%; H, 6.93%. Found: C, 66.90%; H, 6.97%.

EXAMPLE 13

*Preparation of various 2,6,8-triamino-7-methyl-purine derivatives from 2,6,8-trichloro-7-methyl-purine and the corresponding amines*

(a) 2,6,8-TRIMORPHOLYL-7-METHYL-PURINE

A mixture of 2.4 gm. (0.01 mol) 2,6,8-trichloro-7-methyl-purine and 25 cc. morpholine (boiling point=128° C.) was refluxed at the boiling point for 30 minutes. The clear solution thus obtained was allowed to cool, whereby morpholine hydrochloride crystallized out. The reaction mixture was taken up in about 100 cc. water, whereby the morpholine hydrochloride dissolved, while a crystalline precipitate formed. The crystalline precipitate was separated by vacuum filtration, washed and dried. 2.9 gm., that is 75% of theory of a compound having the structural formula

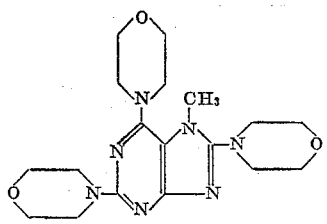

were obtained. After reprecipitation from 0.1 N hydrochloric acid and recrystallization from water the purified reaction product was obtained in the form of colorless needles having a melting point of 238 to 240° C.

(b) 2,6,8-TRIPIPERIDYL-7-METHYL-PURINE

By following a procedure analogous to that described under (a) above, but using an equivalent amount of piperidine instead of morpholine and boiling the reaction mixture under reflux for two hours (at about 106° C.), a compound having the structural formula

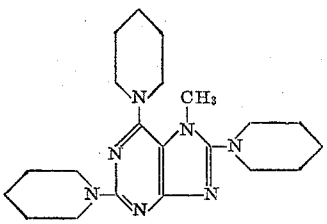

was obtained with a yield of 91% of theory. The raw product was reprecipitated once from about 0.05 N hydrochloric acid and recrystallized once from methanol, yielding the pure product in the form of microcrystalline prisms having a melting point of 216 to 218° C.

EXAMPLE 14

2,6-dimorpholyl-8-phenyl-purine

A mixture of 1.3 gm. (0.05 mol) raw 2,6-dichloro-8-phenyl-purine and 30 cc. morpholine were refluxed at the boiling point for 1 hour. The warm reddish-brown solution thus obtained was then poured into about 300 cc. water, whereby an ivory, amorphous precipitate formed. This precipitate was separated by vacuum filtration, washed and dried. 1.0 gm., that is 55% of theory, or a compound having the structural formula

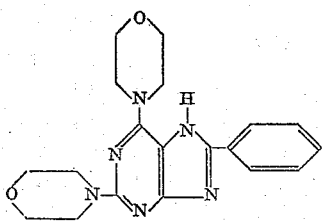

was obtained. For purification, the raw reaction product was reprecipitated once from 0.5 N hydrochloric acid and recrystallized once from methanol, yielding colorless, fine microcrystalline needles having a melting point of 244 to 245° C.

Analysis.—$C_{19}H_{22}N_6O_2$—molecular weight: 366.4. Calculated: C, 62.28%; H, 6.05%. Found: C, 62.10%; H, 6.39%.

EXAMPLE 15

2,6-dimorpholylyl-8-benzyl-purine

By following a procedure analogous to that described in Example 14, but using 3.8 gm. (0.01 mol) raw 2,6-dichloro-8-benzyl-purine instead of 2,6-dichloro-8-phenyl-purine, 2.0 gm., that is 53% of theory, of a compound having the structural formula

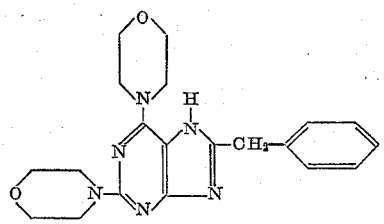

were obtained. The raw product was purified by reprecipitating it once from 0.5 N hydrochloric acid and recrystallizing it once from a mixture of methanol and water (2:1), yielding microcrystalline needles having a melting point of 223 to 224° C.

Analysis.—$C_{20}H_{24}N_6O_2$—molecular weight: 380.5. Calculated: C, 63.15%; H, 6.35%. Found: C, 62.95%; H, 6.50%.

EXAMPLE 16

2-phenylmercapto-6,8-dimorpholyl-7-methyl-purine

A mixture of 5.1 gm. (0.015 mol) 2-chloro-6,8-dimorpholyl-7-methyl-purine, 5 cc. (about 0.05 mol) thiophenol, 2 cc. pyridine and 50 cc. dimethylformamide was refluxed at the boiling point for 1½ hours. The dimethylformamide solvent was then removed by vacuum distillation and the oily residue was first digested with 80 cc. 1 N ammonio (greasy, grayish-green mass) and then with 50 cc. methanol. The virtually colorless substance thus obtained was separated by vacuum filtration and dried in a vacuum at room temperature. 4.4 gm., that is 71% of theory, of a compound having the structural formula

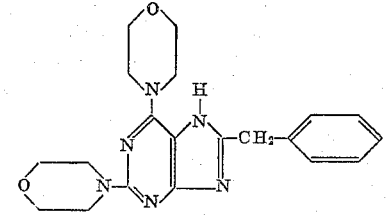

were obtained. For analysis, the raw reaction product was reprecipitated twice from very dilute sulfuric acid and recrystallized twice from about 70 cc. methanol. The purified product was a colorless microcrystalline product (needles) having a melting point of 100 to 102° C.

Analysis.—$C_{20}H_{24}O_2N_6S$—molecular weight: 412.5. Calculated: C, 58.23%; H, 5.87%. Found: C, 57.87%; H, 6.13%.

EXAMPLE 17

2-phenoxy-6,8-dimorpholyl-7-methyl-purine 6.8 gm. (0.02 mol) 2-chloro-6,8-dimorpholyl-7-methyl-purine were introduced into a molten mixture of 15 cc. phenol and 1 gm. sodium hydroxide at 60° C., and the resulting mixture was heated at 200° C. for 10 minutes. The reaction mixture was then taken up in about 250 cc. dilute ammonia, whereby an oily precipitate formed which, however, soon solidified. The precipitate was separated by vacuum filtration, washed and dried. 6.9 gm., that is 87% of theory, of a compound having the structural formula

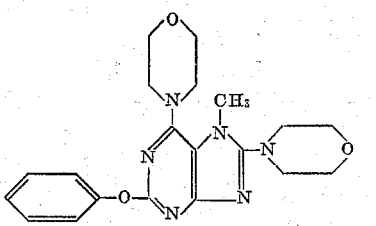

were obtained. The raw product was purified by reprecipitating it three times from very dilute sulfuric acid and recrystallizing it once from methanol, yielding a colorless microcrystalline powder having a melting point of 192 to 194° C.

*Analysis.*—$C_{20}H_{24}O_3N_6$ — molecular weight: 396.4. Calculated: C, 60.59%; H, 6.10%. Found: C, 60.82%; H, 6.16%.

EXAMPLE 18

*2,6,8-trimorpholyl-9-benzyl-purine*

1.0 gm. (0.03 mol) 2,6,8-trichloro-9-benzyl-purine, recrystallized from methanol in the form of a colorless, microcrystalline powder (prisms) having a melting point of 126 to 128° C., were heated with 10 cc. morpholine in a closed tube for 90 minutes at 160° C. After cooling, the reaction mixture was rinsed out of the tube with about 200 cc. 1 N hydrochloric acid, and the resulting suspension was filtered to remove a small amount of undissolved material. Thereafter, the reaction product was precipitated from the filtrate with 2 N potassium hydroxide. The precipitate was separated by vacuum filtration, washed, dried at 105° C. and combined with the previous filter cake. 0.8 gm., that is 59% of theory, of a compound having the structural formula

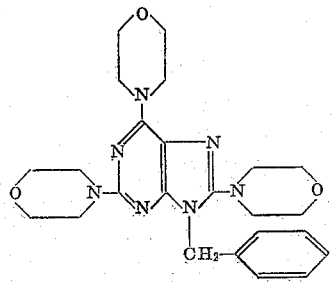

was obtained in the form of an amorphous, colorless powder having a melting point of 162 to 163° C.

*Analysis.* — $C_{23}H_{31}O_3N_7$ — molecular weight: 453.5. Calculated: C, 60.91%; H, 6.89%. Found: C, 61.54%; H, 6.89%.

EXAMPLE 19

*Preparation of various 2,6-diamino-8-hydroxy-9-aryl-purine derivatives from 2,6-dichloro-8-hydroxy-9-aryl-purines and the corresponding amines*

(a) 2,6-DIMORPHOLYL-8-HYDROXY-9-(p-CHLORO-PHENYL)-PURINE

A mixture of 1.5 gm. (0.05 mol) 2,6-dichloro-8-hydroxy-9-(p-chloro-phenyl)-purine and 30 cc. morpholine was refluxed for two hours. Thereafter, the reaction mixture, a crystalline suspension, was taken up in about 100 cc. water, whereby a light brown, crystalline precipitate formed which was separated by vacuum filtration, washed and dried. The raw reaction product was dissolved once in about 15% cold hydrochloric acid and reprecipitated by diluting the acid solution with water. Subsequently, the reprecipitated product was recrystallized once from a mixture of dioxan and ethanol (2:1), yielding 0.5 gm., that is 24% of theory, of an analytically pure compound having the structural formula

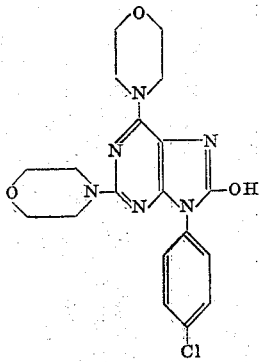

in the form of colorless, microcrystalline, felted needles having a melting point of 346 to 348° C.

*Analysis.*—$C_{19}H_{21}O_3N_6Cl$—molecular weight: 416.9. Calculated: C, 54.74%, H, 5.09%. Found: C, 54.87%; H, 4.99%.

(b) 2,6-DIMORPHOLYL-8-HYDROXY-9-(p-METHOXY-PHENYL)-PURINE)

By following a procedure analogous to that described under (a) above, but using an equivalent amount of 2,6-dichloro-9-(p-methoxy-phenyl)-purine, instead of 2,6-dichloro-8-hydroxy-(p-chloro-phenyl)-purine, a compound having the structural formula

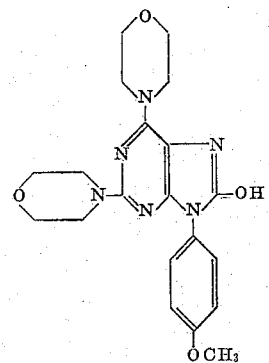

was obtained with a yield of 32% of theory. Reprecipitated from about 15% hydrochloric acid by diluting the acid solution with water, the purified product was obtained in the form of a microcrystalline, colorless substance composed of felted needles which had no melting point up to 350° C.

(c) 2,6-DIPIPERIDYL-8-HYDROXY-9-(p-TOLYL)-PURINE

By following a procedure analogous to that described under (a) above, but using instead of 2,6-dichloro-8-hydroxy-9-(p-chloro-phenyl)-purine and morpholyl an equivalent amount of 2,6-dichloro-8-hydroxy-9-(p-tolyl)-purine and piperidine, a compound having the structural formula

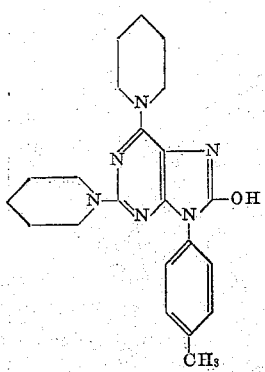

was obtained with a yield of 51% of theory. Reprecipitated from about 15% cold hydrochloric by diluting the acid solution with water, the purified reaction product was obtained in the form of a virtually colorless, microcrystalline powder having a melting point of 316 to 318° C.

EXAMPLE 20

*Preparation of various 2,6,8-triamino-7-methyl-purine derivatives from 2-chloro-6,8-diamino-7-methyl-purines and the corresponding amines*

(a) 2,8-DIMORPHOLYL-6-PIPERIDYL-7-METHYL-PURINE

A mixture of 5.0 gm. (0.015 mol) 2-chloro-8-morpholyl-6-piperidyl-7-methyl-purine, having a melting point of 224 to 226° C. and obtained from 2,6-dichloro-8-morpholyl-7-methyl-purine having a melting point of 193 to 194° C. and piperidine in acetone by refluxing the mixture at the boiling point, and 20 cc. morpholine was refluxed at the boiling point for 30 minutes. While the reaction mixture, a clear, yellowish-brown solution, was still warm, it was poured into about 100 cc. water, whereby a yellow crystalline precipitate formed after a short period of time. The precipitate was separated by vacuum filtration, washed and dried. 3.4 gm., that is 58% of theory, of a compound having the structural formula

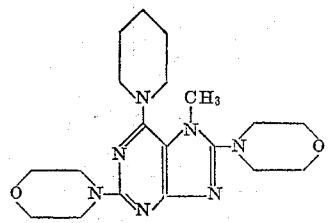

were obtained. For analysis, the raw reaction product was reprecipitate once from cold 0.1 N hydrochloric acid and recrystallized once from a mixture of methanol and water (1:3), yielding ivory, microcrystalline prisms having a melting point of 207 to 209° C.

Analysis.—$C_{19}H_{29}O_2N_7$—molecular weight: 387.5. Calculated: C, 58.89%; H, 7.54%. Found: C, 58.90%; H, 7.68%.

(b) 2-PIPERIDYL-6,8-DIMORPHOLYL-7-METHYL-PURINE

By following a procedure analogous to that described under (a) above, but using instead of 2-chloro-6-piperidyl-8-morpholyl-7-methyl-purine and morpholine an equivalent amount of 2-chloro-6,8-dimorpholyl-7-methyl-purine and piperidine, a compound having the structural formula

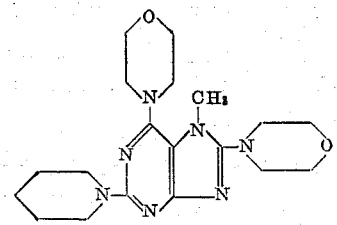

was obtained with a yield of 82% of theory. Recrystallized from a mixture of petroleum ether and benzene (3:1), the purified product was a colorless, microcrystalline powder having a melting point of 190 to 192° C.

(c) 2,6-DIPIPERIDYL-8-MORPHOLYL-7-METHYL-PURINE

By following a procedure analogous to that described under (a) above, but using instead of 2-chloro-6-piperidyl-8-morpholyl-7-methyl-purine and morpholine an equivalent amount of 2,6-dichloro-8-morpholyl-7-methyl-purine and two molar portions of piperidine, and refluxing the mixture at the boiling point for 3 hours, a compound having the structural formula

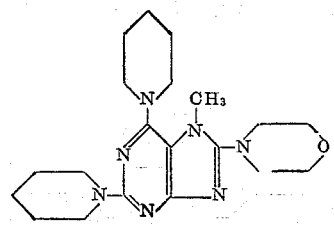

was obtained with a yield of 53% of theory. Recrystallized from a mixture of methanol and water (1:1), the purified product was obtained in the form of colorless, microcrystalline prisms having a melting point of 197 to 199° C.

The following table lists additional compounds according to the present invention which were prepared. In addition to the name of the reaction product, the table shows the reactants used in preparing the purine derivative in question, the procedure employed, the yield, and the melting point of the reaction product in each case.

| Example | Compound prepared | Starting material | Procedure Analogous to example number | Yield, Percent of theory | M.P. °C. | Remarks |
| --- | --- | --- | --- | --- | --- | --- |
| 21 | 2,6-dipiperidyl-8-amino-7-methyl-purine. | 2,6-dichloro-8-amino-7-methyl-purine and piperidine. | 14 | 97 | 230–232 | |
| 22 | 2,6-dimorpholyl-8-(N-phenyl-piperazino)-7-methyl-purine. | 2,6-dichloro-8-(N-phenyl-piperazino)-7-methyl-purine and morpholine. | 5 | 93 | 226–228 | Reflux |
| 23 | 2-[N-(p-chlorophenyl)-piperazine]-6,8-dimorpholyl-7-methyl-purine. | 2-chloro-6,8-dimorpholyl-7-methyl-purine and N-(p-chlorophenyl)-piperazine. | 4 | 79 | 227–230 | In the presence of triethyl-amine. |
| 24 | 2,6-dimorpholyl-8-hexamethylene-imino-7-methyl-purine. | 2,6-dichloro-8-hexamethylene-imino-7-methyl-purine and morpholine. | 5 | 75 | 159–161 | |
| 25 | 2-hexamethylene-imino-6,8-dimorpholyl-7-methyl-purine. | 2-chloro-6,8-dimorpholyl-7-methyl-purine and hexamethyleneimine. | 4 | 92 | 200–202 | Reflux for 5 hours. |
| 26 | 2-chloro-6,8-dimorpholyl-9-(p-tolyl)-purine. | 2,6,8-trichloro-9-(p-tolyl)-purine and morpholine. | 1 | 88 | 197–198 | |
| 27 | 2,8-dimorpholyl-6-mercapto-7-methyl-purine. | 2,8-dichloro-6-mercapto-7-methyl-purine and morpholine. | 5 | 42 | 255–257 | Reflux |
| 28 | 2-ethoxy-6,8-dipiperidyl-7-methyl-purine. | 2-chloro-6,8-dipiperidyl-7-methyl-purine and ethyl alcohol. | 9 | 53 | 134–135 | |
| 29 | 2-dimethylamino-6,8-dimorpholyl-7-methyl-purine. | 2-chloro-6,8-dimorpholyl-7-methyl-purine and dimethylamine. | 4 | 94 | 167–169 | |
| 30 | 2,6,8-trimorpholyl-7-methyl-purine. | 2,6-dichloro-8-morpholyl-7-methyl-purine and morpholine. | 14 | 46 | 235–237 | |
| 31 | 2,6-dimorpholyl-8-hydroxy-7-methyl-purine. | 2,6-dichloro-8-hydroxy-7-methyl-purine and morpholine. | 19 | 81 | 271–273 | |
| 32 | 2,6-dipiperidyl-8-hydroxy-7-methyl-purine. | 2,6-dichloro-8-hydroxy-7-methyl-purine and piperidine. | 19 | 82 | 231–233 | |
| 33 | 2-morpholyl-6-diethylamino-8-hydroxy-7-methyl-purine. | 2-chloro-6-diethylamino-8-hydroxy-7-methyl-purine and morpholine. | 4 | 57 | 182–184 | |
| 34 | 2-morpholyl-6-piperidyl-8-hydroxy-7-methylpurine. | 2-chloro-6-piperidyl-8-hydroxy-7-methyl-purine and morpholine. | 20 | 75 | 248–250 | |
| 35 | 2,6-dimorpholyl-8-chloro-purine. | 2,6,8-trichloro-purine and morpholine. | 1 | 72 | ¹308 | |
| 36 | 2-chloro-6,8-di-(N-phenylpiperazino)-7-methyl-purine. | 2,6,8-trichloro-7-methyl-purine and N-phenyl-piperazine. | 1 | 75 | About 120 | In the presence of triethylamine. Reflux in acetone |
| 37 | 2-chloro-6-piperidyl-8-morpholyl-7-methyl-purine | 2,6-dichloro-8-morpholyl-7-methyl-purine and piperidine | 2 | 86 | 237–239 | |
| 38 | 2-chloro-6-morpholyl-8-(p-chloro-anilino)-7-methyl-purine | 2,6-dichloro-8-(p-chloro-anilino)-7-methyl-purine and morpholine | 2 | 90 | 147–149 | |
| 39 | 2-chloro-6,8-dimorpholyl-9-methyl-purine | 2,6-dichloro-8-morpholyl-9-methyl-purine and morpholine | 2 | 81 | 213–216 | |
| 40 | 2-chloro-6,8-dipiperidyl-9-methyl-purine | 2,6-dichloro-8-piperidyl-9-methyl-purine and piperidine | 2 | 67 | 162–163 | |

See footnote at end of table.

| Example | Compound prepared | Starting material | Procedure Analogous to example number | Yield, Percent of theory | M.P. °C. | Remarks |
|---|---|---|---|---|---|---|
| 41 | 2-methylethanolamino-6,8-dipiperidyl-7-methyl-purine | 2-chloro-6,8-dipiperidyl-7-methyl-purine and methyl-ethanolamine | 4 | 83 | 180–182 | |
| 42 | 2-morpholyl-6,8-di-(N-phenyl-piperazino)-7-methyl-purine | 2-chloro-6,8-di-(N-phenyl-piperazino)-7-methyl-purine and morpholine | 20 | 53 | 156–158 | |
| 43 | 2,6,8-trimorpholyl-9-methyl-purine | 2,6,8-trichloro-9-methyl-purine and morpholine | 18 | 62 | 249–250 | |
| 44 | 2,6,8-tripiperidyl-9-methyl-purine | 2,6,8-trichloro-9-methyl-purine and piperidine | 18 | 62 | 135–137 | |
| 45 | 2-piperidyl-6,8-dimorpholyl-9-methyl-purine. | 2-chloro-6,8-dimorpholyl-9-methyl-purine and piperidine | 4 | 92 | 188–189 | |
| 46 | 2,8-dipiperidyl-6-morpholyl-9-methyl-purine. | 2,8-dichloro-6-morpholyl-9-methyl-purine and piperidine | 5 | 83 | 129–130 | |
| 47 | 2-morpholyl-6,8-dipiperidyl-9-methyl-purine. | 2-chloro-6,8-dipiperidyl-9-methyl-purine and morpholine | 4 | 90 | 134–135 | |
| 48 | 2,8-dimorpholyl-6-piperidyl-9-methyl-purine. | 2,8-dichloro-6-piperidyl-9-methyl-purine and morpholine | 5 | 98 | 169–171 | |
| 49 | 2,6-dipiperidyl-8-(β-hydroxyethylamino)-7-methyl-purine. | 2,6-dichloro-9-(β-hydroxyethylamino)-7-methyl-purine and piperidine | 20 | 94 | 191–193 | |
| 50 | 2,6-dimorpholy-8-benzylmethylamine-7-methyl-purine. | 2,6-dichloro-8-benzyl-methylamino-7-methyl-purine and morpholine | 20 | 95 | 163–165 | |
| 51 | 2,6-dimorpholyl-8-(β-hydroxyethylamino)-7-methyl-purine. | 2,6-dichloro-8-(β-hyroxyethylamino)-7-methyl-purine and morpholine | 20 | 81 | 223–225 | |
| 52 | 2,8-dimorpholyl-6-piperidyl-purine | 2,8-dichloro-6-piperidylpurine and morpholine | 5 | 76 | 200–202 | |
| 53 | 2,6,8-trimorpholyl-7-benzyl-purine | 2,6,8-trichloro-7-benzylpurine and morpholine | 13 | 92 | 224–226 | |
| 54 | 2,8-dimorpholyl-6-(N-methyl-piperazino)-purine | 2,8-dichloro-6-(N-methyl-piperazino)-purine and morpholine | 4 | 79 | 257–258 | |
| 55 | 2,6,8-trimorpholyl-7-morpholino-ethyl-purine | 2-chloro-6,8-dimorpholyl 7-(morpholyl-ethyl)-purine and morpholine | 20 | 64 | 212–213 | |
| 56 | 2,6-dimorpholyl-8-(N-methyl-piperazino)-purine | 2,6-dichloro-8-(N-methyl-piperazino)-purine and morpholine | 4 | 71 | 235–236 | |
| 57 | 2,6-dipiperidyl-8-(benzyl-methyl)-amino-7-methyl-purine | 2,6-dichloro-8-(benzyl-methyl-amino)-7-methyl-purine and piperidine | 20 | 86 | 160–162 | |
| 58 | 2-(benzyl-methyl-amino)-6,8-dipiperidyl-7-methyl-purine | 2-chloro-6,8-dipiperidyl-7-methyl-purine and benzylmethyl-amine | 20 | 81 | 153–155 | |
| 59 | 2-(N-methyl-piperazino)-6,8-dipiperidyl-7-methyl-purine | 2-chloro-6,8-dipiperidyl-7-methyl-purine and N-methyl-piperazine | 20 | 89 | 183–185 | |
| 60 | 2-(N-methyl-piperazino)-6,8-dimorpholyl-7-methyl-purine | 2-chloro-6,8-dimorpholyl-7-methyl-purine and N-methyl-piperazine | 20 | 61 | 209–211 | |
| 61 | 2-chloro-6,8-di-(hexa-methyleneimino)-7-methyl-purine | 2,6-dichloro-8-hexa-methyleneimino-7-methyl-purine and hexamethyleneimine | 2 | 68 | 170–172 | |
| 62 | 2-chloro-6,8-dipyrrolidyl-7-methyl-purine. | 2,6,8-trichloro-7-methylpurine and pyrrolidine. | 1 | 86 | 218–220 | |
| 63 | 2-diethanolamino-6,8-dipiperidyl-7-methyl-purine. | 2-chloro-6,8-dipiperidyl-7-methyl-purine and diethanolamine. | 4 | 52 | 194–196 | |
| 64 | 2-isoamylamino-6,8-dipiperidyl-7-methyl-purine. | 2-chloro-6,8-dipiperidyl-7-methyl-purine and isoamymamine. | 4 | 63 | 189–190 | |
| 65 | 2,6-dipyrrolidyl-8-allylamino-7-methyl-purine. | 2,6-dichloro-8-allylamino-7-methyl-purine and pyrrolidine. | 20 | 93 | 213–215 | Reaction temperature 88° C. |
| 66 | 2-(β,γ-dihydroxy-propyl-amino)-6,8-dipiperidyl-7-methyl-purine. | 2-chloro-6,8-dipiperidyl-7-methyl-purine and β,γ-dihydroxypropyl-amine. | 4 | 70 | 242–244 | |
| 67 | 6,8-dimorpholyl-7-methyl-purine | 6,8-dichloro-7-methyl-purine and morpholine. | 6 | 41 | 251–252 | |
| 68 | 2-hydroxy-6-methylamino-8-piperidyl-methyl-purine. | 2-hydroxy-6-methylamino-8-chloro-7-methyl-purine and piperidine. | 4 | 56 | ¹ 260 | |
| 69 | 2,6-dimorpholyl-8-cyclohexylamino-7-methyl-purine. | 2,6-dichloro-8-cyclohexylamino-7-methyl-purine and morpholine. | 20 | 69 | 148–150 | |
| 70 | 2,8-dimorpholyl-6-anilinopurine | 2,8-dichloro-6-anilinopurine and morpholine. | 5 | 78 | 162–163 | |
| 71 | 2,8-dimorpholyl-6-aminopurine | 2,8-dichloro-6-aminopurine and morpholine. | 5 | 84 | 278–279 | |
| 72 | 2,8-dimorpholyl-6-diethanolamino-purine | 2,8-dichloro-6-diethanolamino-purine and morpholine | 5 | 70 | 252–253 | |
| 73 | 2,8-dipiperidyl-6-(β-hydroxy-ethyl-amino)-purine | 2,8-dichloro-6-(β-hydroxy-ethylamino)-purine and piperidine | 5 | 84 | 163–165 | |
| 74 | 2-methyl-cyclohexyl-amino-6,8-dimorpholyl-7-methyl-purine | 2-(methyl-cyclohexyl-amino)-6,8-dichloro-7-methyl-purine and morpholine | 4 | 76 | 231–233 | |
| 75 | 2-amino-6-morpholyl-8-chloro-purine. | 2,8-dichloro-6-morpholyl-purine and ammonia | 2 | 66 | ¹ >300 | In liquid NH₃ under pressure. Hydrochloride. |
| 76 | 2,8-dimorpholyl-6-benzyl-amino-purine-hydrochloride | 2,8-dichloro-6-benzyl-amino-purine and morpholine | 5 | 61 | 225–227 | |
| 77 | 2,8-dianilino-6-piperidyl-purine-hydrochloride | 2,8-dichloro-6-piperidyl-purine and aniline | 5 | 87 | ¹ >300 | Do. |
| 78 | 2,8-dipiperidyl-6-diethanol-amino-purine | 2,8-dichloro-6-diethanol-amino-purine and piperidine | 5 | 72 | 188–190 | |
| 79 | 2,8-dimorpholyl-6-hydroxy-purine | 2,8-dichloro-6-hydroxy-purine and morpholine. | 12 | 66 | ¹ >300 | |
| 80 | 2,8-dimorpholyl-6-ethoxy-purine | 2,8-dichloro-6-ethoxy-purine and morpholine | 12 | 69 | 252–255 | |
| 81 | 2-benzyloxy-6,8-dimorpholyl-7-methylpurine. | 6,8-dimorpholyl-2-chloro-7-methylpurine and benzylalcohol | 9 | 57 | 213–215 | |
| 82 | 2,6-di-(3′-methoxypropylamino)-8-morpholyl-purine. | 2,6-di-(3′-methoxypropylamino)-8-chloro-purine and morpholine | 20 | 73 | 204–205 | |
| 83 | 2-morpholyl-6,8-diallylamino-7-methyl-purine. | 2-chloro-6,8-diallylamino-7-methyl-purine and morpholine. | 20 | 68 | 206–207 | |
| 84 | 2,6-dimorpholyl-8-(β-diethyl-amino-ethylamino)-7-methyl-purine. | 2,6-dichloro-8-(β-diethylamino-ethylamino)-7-methyl-purine and morpholine. | 20 | 65 | 144–145 | |
| 85 | 2,6-dimorpholyl-8-(3′-methoxy-propylamino)-7-methylpurine. | 2,6-dichloro-8-(3′-methoxypropylamino)-7-methylpurine and morpholine. | 20 | 59 | 104–106 | |
| 86 | 2,6,8-tri-(3′-methyl-piperidino)-7-methylpurine. | 2,6,8-trichloro-7-methylpurine and 3′-methylpiperidine. | 13 | 78 | 70–72 | |
| 87 | 2-morpholyl-6,8-di-(cyclohexyl-amino)-7-methyl-purine | 2-chloro-6,7-di(cyclohexyl-amino)-7-methyl-purine and morpholine | 20 | 97 | 247–249 | |
| 88 | 2,6,8-tri-(4′-methyl-piperidino)-7-methyl-purine. | 2,6,8-trichloro-7-methyl-purine and 4′-methylpiperidine | 13 | 67 | 210–211 | |
| 89 | 2,6,8-tri-(2′,6′-dimethyl-morpholyl)-7-methyl-purine. | 2,6,8-trichloro-7-methyl-purine and 2′,6′-dimethyl-morpholine | 13 | 54 | 239–241 | |
| 90 | 2,6,8-tri-(2′,6′-dimethyl-morpholyl)-purine | 2,6,8-trichloro-purine and 2,6-dimethyl-morpholine | 3 | 73 | 152–154 | |
| 91 | 2,6,8-tri-(1′,2′,5′,6′-tetrahydropyridyl)-7-methyl-purine | 2,6,8-trichloro-7-methyl-purine and 1,2,5,6-tetrahydropyridine | 13 | 76 | 133–135 | |

¹ Decomposed.

As previously stated and illustrated in the preceding examples, the tertiary amines according to the present invention form non-toxic, pharmacologically useful acid addition salts. It is well known in the pharmacological art that the non-toxic acid addition salts of basic pharmacologically active substances do not materially differ from the basic substances themselves in their pharmacological effects. The acid addition salts merely provide a desirable solubility factor. So it is with the present purine derivatives.

Typical examples of pharmacologically useful non-toxic acid addition salts of the present purine derivatives are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicyclic acid, nicotinic acid, 2-furoic acid and the like. The hydrochlorides, however, have been found to be particularly suitable for practical purposes.

The heterocyclic-substituted purine derivatives according to the present invention and their water-soluble, non-toxic acid addition salts are useful pharmacological agents and exhibit pharmacological properties which are different from the other known purine derivatives. More particularly, the compounds embraced by Formulas I and II above exhibit excellent coronary dilating properties.

To demonstrate that the compounds according to the present invention have unexpected and surprising properties in comparison to known compounds of related structure, two representative compounds of the group disclosed herein were subjected to comparative tests with two known heterocyclic-substituted theobromine derivatives for determination of the relative coronary dilatation activities of the compounds in question. The comparative test procedure used was the bubble-flow method described by Eckenhoff et al. in American Journal of Physiology, vol. 148, page 582 (1947). The following table shows the results of these tests.

| Compound | Relative value of coronary dilatation activity |
|---|---|
| According to invention: | |
| 2-hydroxy-6-methylamino-8-piperidyl-7-methyl-purine | 2.5 |
| 2,6,8-trimorpholyl-7-methyl-purine | 6 |
| 2,8-dimorpholyl-6-piperidyl-purine | 8 |
| Known compounds of related structure: | |
| 8-piperazino-theobromine (French patent 584,735) | 1 |
| 8-piperidyl-theobromine | 1.5 |

The results clearly establish that the representative compounds according to the present invention are distinctly and unexpectedly superior to the known compounds in their effectiveness of increasing coronary blood flow.

Other compounds according to the present invention which exhibit an excellent coronary dilatation activity are the following given as examples only:

2,6,8-trimorpholyl-purine
2-morpholyl-6,8-dipiperidino-7-methylpurine
2,6-dimorpholyl-8-piperidino-7-methylpurine
2-chloro-6,8-dimorpholyl-7-methylpurine
2,6-dimorpholyl-7-methylpurine
2,6-dimorpholyl-8-benzylamino-7-methylpurine
2-ethylthio-6,8-dimorpholyl-7-methylpurine
2,8-dimorpholyl-6-piperidino-7-methylpurine
2,6-dimorpholyl-8-hydroxy-7-methylpurine
2-(N-methylpiperazino)-6,8-dipiperidino-7-methylpurine
2,6-dimorpholyl-8-hexamethyleneimino-7-methylpurine
6-(N-methylpiperazino)-2,8-dimorpholyl-purine
2-chloro-6,8-dipiperidino-7-methylpurine
2-methylethanolamino-6,8-dimorpholyl-7-methylpurine
2-pyrrolidino-6,8-dimorpholyl-7-methylpurine
2,6,8-tripiperidino-7-methylpurine
2,6-dimorpholyl-8-methylbenzylamino-7-methylpurine
2-morpholyl-6-diethylamino-8-piperidino-7-methylpurine
2,8-dimorpholyl-6-ethoxy-purine
2,8-dimorpholyl-6-amino-purine
2,8-dipiperidino-6-diethanolamino-purine
2,6,8-trimorpholyl-9-methylpurine
2-diethanolamino-6,8-dipiperidino-7-methylpurine In addition to exhibiting coronary dilating properties, the compounds embraced by Formulas I and II above possess other important pharmacological properties. For example, 2,6-dimorpholyl-7-methyl-purine is effective as a hypotensive agent and respiration stimulant, as well as being five times as effective as a coronary dilatation agent than theophilline. 2-morpholyl-6,8-dipiperidyl-7-methyl-purine also exhibits excellent analgesic and sedative properties. 2-ethylmercapto-6,8-dimorpholyl-7-methyl-purine is also a very effective analgesic. 2,6-dimorpholyl-7-methyl-purine, 2-morpholyl-6,8-dipiperidyl-7-methyl-purine and 2,6,8-tripiperidyl-7-methyl-purine also exhibit effective antipyretic activities, and 2,6,8-trimorpholyl-7-methyl-purine also exhibits antipyretic and sedative properties. 2,6-dimorpholyl-8-methylbenzylamino-7-methyl-purine, 2-(N-methylpiperazino)-6,8-dipiperidino-7-methyl-purine, 2-morpholyl-6,8-dipiperidino-7-methyl-purine, 2,6-dimorpholyl-8-(N-phenylpiperazyl)-7-methyl-purine, 2-hexamethyleneimino-6,8-dimorpholyl-7-methyl-purine, and 2,6-dipiperidyl-8-morpholyl-7-methyl-purine also exhibit effective spasmolytic activities on the intestinal tract.

Finally, 2,6,8-trimorpholyl-purine also exhibits very effective sedative, antipyretic and analgetic properties.

While we have disclosed certain specific embodiments of the present invention, it will be apparent to those skilled in the art that the invention is not limited to these embodiments, and that various changes and modifications can be made without departing from the spirit of the invention or the scope of the appended claims.

I claim:
1. Compounds selected from the group consisting of tri- and tetra-substituted purines having the structural formula

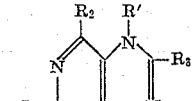

and

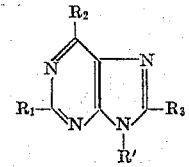

wherein R' is selected from the group consisting of hydrogen, lower alkyl, phenyl-substituted lower alkyl, N-morpholyl-substituted lower alkyl, phenyl, halo-substituted phenyl, lower alkyl-substituted phenyl and lower alkoxy-substituted phenyl, one of substituents $R_1$, $R_2$ and $R_3$ is a heterocyclic radical selected from the group consisting of hexamethyleneimino, N-piperidyl, N-pyrrolidyl, N-tetrahydropyridyl, N-morpholyl, lower alkyl-substituted N-piperidyl, lower alkyl-substituted N-morpholyl, N'-lower alkyl-substituted N-piperazyl, N'-phenyl-substituted N-piperazyl and N'-halophenyl-substituted N-piperazyl, one other of substituents $R_1$, $R_2$ and $R_3$ is selected from the group consisting of alkyl-amino, di-alkyl-amino, phenyl-amino, benzyl-amino, hydroxy-alkyl-amino, hydroxyalkyl-alkyl-amino, alkylamino-alkyl-amino, hydrazino, guanido, hexamethyleneimino, N-piperidyl, N-pyrrolidyl, N-tetrahydropyridyl, N-morpholyl, lower alkyl-substituted N-piperidyl, lower alkyl-substituted N-morpholyl, N'-lower alkyl-substituted N-piperazyl, N'-phenyl-substituted N-piperazyl and N'-halophenyl-substituted N-piperazyl and the third of substituents $R_1$, $R_2$ and $R_3$ is selected from the group consisting of halogen, hydroxyl, lower alkoxy, phenoxy, lower alkoxy-substituted lower alkoxy, mercapto, lower alkyl-mercapto, phenyl-mercapto, amino, alkyl-amino, dialkyl-amino, phenyl-amino, benzyl-amino, hydroxyalkyl-amino, hydroxyalkyl-alkyl-amino, alkylamino-alkylamino, hydrazino, guanido, hexamethyleneimino, N-piperidyl, N-pyrrolidyl, N-tetrahydropyridyl, N-morpholyl, lower alkyl-substituted N-piperidyl, lower alkyl-substituted N-morpholyl, N'-lower alkyl-substituted N-piperazyl, N'-phenyl-substituted N-piperazyl and N'-halophenyl-substituted N-piperazyl, and $R_3$ is in addition selected from the group consisting of phenyl, phenyl-substituted lower alkyl and N-morpholyl-substituted lower alkyl, and their non-toxic, pharmacologically acceptable, water-soluble acid addition salts.

2. 2,6,8-tri-(N-morpholyl)-purine.
3. 2 - (N - morpholyl)-6,8-di-(N-piperidyl)-7-methyl-purine.
4. 2,6,8-tri-(N-morpholyl)-7-methyl-purine.
5. 2-chloro-6,8-di-(N-morpholyl)-7-methyl-purine.
6. 2,6-di-(N-morpholyl)-8-hydroxy-7-methyl-purine.
7. 2.8-di-(N-piperidyl)-6-diethanolamino-purine.
8. 2,8-di-(N-morpholyl)-6-diethanolamino-purine.
9. 2 - methylethanolamino - 6,8 - di - (N-piperidyl)-7-methyl-purine.

References Cited in the file of this patent

UNITED STATES PATENTS 2,844,576 Goldman et al. ---------- July 22, 1958

UNITED STATES PATENT OFFICE
CERTIFICATION OF CORRECTION

Patent No. 3,016,378                      January 9, 1962

Josef Roch

It is hereby certified that error appears in the above numbered patent requiring correction and that the said Letters Patent should read as corrected below.

Column 5, line 21, for "morproline" read -- morpholine --; lines 68 and 69, for "meltpint" read -- melting point --; column 16, lines 35 to 43, the formula should appear as shown below instead of as in the patent:

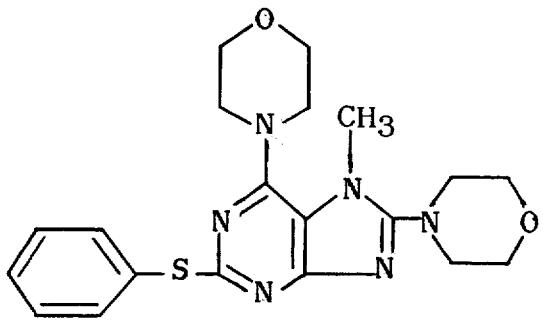

column 19, line 27, for "reprecipitate" read -- reprecipitated --; column 21, in the table, under the heading "Compound prepared", Example 50 should read as follows:

2,6-dimorpholyl-8-benzylmethylamino-7-methyl-purine;

same heading, Example 86, for "2:6,8-" read 2,6,8- --.

Signed and sealed this 8th day of May 1962.

(SEAL)
Attest:

ERNEST W. SWIDER                      DAVID L. LADD
Attesting Officer                       Commissioner of Patents